United States Patent
Duyvesteyn

(10) Patent No.: US 11,142,809 B2
(45) Date of Patent: Oct. 12, 2021

(54) SYSTEMS AND PROCESSES FOR RECOVERING SCANDIUM VALUES FROM LATERITE ORES

(71) Applicant: Scandium International Mining Corporation, Sparks, NV (US)

(72) Inventor: Willem P. C. Duyvesteyn, Sparks, NV (US)

(73) Assignee: Scandium International Mining Corp., Sparks, NV (US)

( * ) Notice: Subject to any disclaimer, the term of this patent is extended or adjusted under 35 U.S.C. 154(b) by 202 days.

(21) Appl. No.: 15/040,116

(22) Filed: Feb. 10, 2016

(65) Prior Publication Data

US 2016/0289795 A1    Oct. 6, 2016

Related U.S. Application Data

(60) Provisional application No. 62/114,429, filed on Feb. 10, 2015.

(51) Int. Cl.
| | |
|---|---|
| *C22B 59/00* | (2006.01) |
| *C22B 3/08* | (2006.01) |
| *C22B 3/22* | (2006.01) |
| *C22B 3/04* | (2006.01) |
| *C22B 1/24* | (2006.01) |

(52) U.S. Cl.
CPC .............. *C22B 59/00* (2013.01); *C22B 1/24* (2013.01); *C22B 3/04* (2013.01); *C22B 3/08* (2013.01); *C22B 3/22* (2013.01); *Y02P 10/234* (2015.11)

(58) Field of Classification Search
CPC .... C22B 1/00; C22B 3/04; C22B 3/08; C22B 59/00
See application file for complete search history.

(56) References Cited

U.S. PATENT DOCUMENTS

| | | | |
|---|---|---|---|
| 2,824,783 | A | 2/1958 | Peppard et al. |
| 2,874,039 | A | 2/1959 | Pruvot |
| 3,013,859 | A | 12/1961 | Kuhlman et al. |
| 3,146,063 | A | 8/1964 | Moore et al. |
| 3,554,693 | A | 1/1971 | Orlandini et al. |
| 3,619,181 | A | 11/1971 | Willey |
| 3,809,549 | A * | 5/1974 | Opratko ................ C22B 23/043 423/140 |

(Continued)

FOREIGN PATENT DOCUMENTS

| | | | |
|---|---|---|---|
| AU | 2008101213 | * | 1/2009 |
| CA | 543366 | | 9/1957 |

(Continued)

OTHER PUBLICATIONS

Hey, M. H., et al. "Eggonite (Kolbeckite, Sterrettite), ScPO4 2H2O." Mineralogical Magazine, pp. 493-497. (Year: 1982).*

(Continued)

*Primary Examiner* — Tima M. McGuthry-Banks
(74) *Attorney, Agent, or Firm* — John A. Fortkort; Fortkort & Houston PC

(57) ABSTRACT

A method is provided for extracting scandium values from a scandium bearing laterite ore. The method includes providing a portion of a scandium bearing laterite ore having an average particle size of no more than 200 mesh, leaching the ore to produce a leachate, and recovering scandium values from the leachate.

27 Claims, 7 Drawing Sheets

(56) References Cited

U.S. PATENT DOCUMENTS

| | | | |
|---|---|---|---|
| 3,846,121 | A | 11/1974 | Schmidt et al. |
| 4,178,996 | A | 12/1979 | van der Lely |
| 4,624,703 | A | 11/1986 | Vanderpool et al. |
| 4,626,280 | A | 12/1986 | Vanderpool et al. |
| 4,659,457 | A | 4/1987 | Martinez |
| 4,689,090 | A | 8/1987 | Sawtell et al. |
| 4,718,995 | A | 1/1988 | Vanderpool et al. |
| 4,718,996 | A | 1/1988 | Vanderpool et al. |
| 4,751,061 | A | 6/1988 | Kim et al. |
| 4,765,909 | A | 8/1988 | Rourke et al. |
| 4,808,384 | A | 2/1989 | Vanderpool et al. |
| 4,816,233 | A | 3/1989 | Rourke et al. |
| 4,898,719 | A | 2/1990 | Rourke et al. |
| 4,965,053 | A | 10/1990 | Herchenroeder et al. |
| 4,968,504 | A | 11/1990 | Rourke |
| 4,980,141 | A | 12/1990 | Kimura et al. |
| 4,988,487 | A | 1/1991 | Lai et al. |
| 5,019,362 | A | 5/1991 | Rourke et al. |
| 5,039,336 | A | 8/1991 | Feuling |
| 5,045,209 | A | 9/1991 | Snyder et al. |
| 5,049,363 | A | 9/1991 | Feuling |
| 5,492,680 | A | 2/1996 | Odekirk |
| 5,597,529 | A | 1/1997 | Tack |
| 5,756,056 | A | 5/1998 | Kimura et al. |
| 5,804,879 | A | 9/1998 | Ogawa et al. |
| 6,126,995 | A | 10/2000 | Estrowitz et al. |
| 6,139,653 | A | 10/2000 | Fernandes et al. |
| 7,563,320 | B2 | 7/2009 | Kolis et al. |
| 9,410,227 | B2 * | 8/2016 | Boudreault ........... C22B 3/0005 |
| 2010/0300941 | A1 | 12/2010 | Domke et al. |
| 2010/0307982 | A1 | 12/2010 | Domke et al. |
| 2011/0000826 | A1 | 1/2011 | Diez et al. |
| 2012/0207656 | A1* | 8/2012 | Duyvesteyn .............. C22B 1/04 423/21.1 |

FOREIGN PATENT DOCUMENTS

| | | | |
|---|---|---|---|
| CN | 1061246 | A | 5/1992 |
| CN | 1478600 | A | 3/2004 |
| CN | 1844421 | A | 10/2006 |
| CN | 101693548 | A | 4/2010 |
| CN | 101696026 | A | 4/2010 |
| DE | 3709463 | A1 | 10/1988 |
| GB | 770138 | | 3/1957 |
| JP | 4198017 | A | 7/1992 |
| JP | 8232026 | A | 9/1996 |
| JP | 9188683 | A | 7/1997 |
| JP | 9249672 | A | 9/1997 |
| JP | 10121164 | A | 5/1998 |
| JP | 11011935 | A | 1/1999 |
| JP | 2000313928 | A | 11/2000 |
| JP | 2005152756 | A | 6/2005 |
| JP | 2005219938 | A | 8/2005 |
| JP | 2007327126 | A | 12/2007 |
| RU | 2102513 | C1 | 1/1998 |
| RU | 2147623 | C1 | 4/2000 |
| RU | 2247788 | C1 | 3/2005 |
| RU | 2371445 | C1 | 10/2009 |
| WO | WO-2015009254 | A2 * | 1/2015 ............... C22B 3/16 |

OTHER PUBLICATIONS

Bernhard, Franz, et al. "Pretulite, ScPO4, a New Scandium Mineral from the Styrian and Lower Austrian Luzulite Occurrences, Austria." American Mineralogist, vol. 83, pp. 625-630. (Year: 1998).*

Onal, Mehmet Ali Recai et al. "Pressure acid leaching of Caldag lateritic nickel ore: An alternative to heap leaching." Hydrometallurgy, vol. 142, pp. 98-107. (Year: 2014).*

Kaiser, John A. "Spec Value Hunter Comment: Recommendation Strategy for EMC Metals Corp." Kaiser Research Online, https://www.mininginteractive.com/assets/docs/KaiserEMCComment20140423.pdf. (Year: 2014).*

Harris, Bryn and Carl White. "Recent Developments in the Chloride Processing of Nickel Laterites." Paper Presented at ALTA May 23-27, Perth, WA. 14 pages. (Year: 2011).*

Ditze, A. & K. Kongolo. "Recovery of scandium from magnesium, aluminium, and iron scrap." Hydrometallurgy 11 pp. 179-184. (Year: 1997).*

Zhang, Pingwei et al., English translation of Abstract from CN1061246(A); published May 20, 1992; 1 page.

Wang, Youhua; English translation of Abstract from CN1478600(A); published Mar. 3, 2004; 1 page.

Wang, Youhua; English translation of Abstract from CN18444421(A); published Oct. 11, 2006; 1 page.

Yuan, Taosheng; English translation of Abstract from CN101693548(A); published Apr. 14, 2010; 1 page.

Yuqi, Zou et al.; English translation of CN101696026(A); published Apr. 21, 2010; 1 page.

Zachmann, Dieter; English translation of DE3709463(A1); published Oct. 6, 1988; 1 page.

Unno, Hiroshi et al.; English translation of JP4198017(A); published Jul. 17, 1992; 1 page.

Ishiwatari, M. et al.; English translation of JP8232026(A); published Sep. 10, 1996; 1 page.

Yamamoto, T. et al.; English translation of JP9188683(A); published Jul. 22, 1997; 1 page.

Kimura, A. et al.; English translation of JP9249672(A); published Sep. 22, 1997; 1 page.

Tanaka, M. et al.; English translation of JP10121164A; published May 12, 1998; 1 page.

Tanaka, T. et al.; English translation of JP11011935(A); published Jan. 19, 1999; 1 page.

Yakushiji, H. et al.; English translation of JP 200313928A; published Nov. 14, 2000; 1 page.

Seko, N. et al.; English translation of JP 2005152756A; published Jun. 16, 2005; 1 page.

Ri, T. et al.; English translation of JP 2005219938A; published Aug. 18, 2005; 1 page.

English Abstract of Russian Publication No. RU2102513 (C1) correlating to Russian patent application No. RU 19930014720; "Method of Preparing Metal Scandium"; Jakov et al.; publication date Jan. 20, 1998; 1 page.

Cameron, A.G.W.; "Stellar Evolution, Nuclear Astrophysics, and Nucleogenesis"; a series of lectures given at Purdue University, Mar. 25 to Apr. 5, 1957, with supplemental notes added Jan. 1958; reprinted Dec. 1961; 197 pages.

* cited by examiner

SYSTEMS AND PROCESSES FOR RECOVERING SCANDIUM VALUES FROM LATERITE ORES

CROSS-REFERENCE TO RELATED APPLICATION

This application claims the benefit of priority from U.S. provisional application No. 62/114,429, filed Feb. 10, 2015, having the same inventor, and the same title, and which is incorporated herein by reference in its entirety.

FIELD OF THE DISCLOSURE

The present disclosure relates generally to systems and methodologies for recovering scandium from scandium bearing laterite ores, and more particularly to such systems and methodologies which leverage the unique attributes of scandium laterites, and of scandium itself, to efficiently extract scandium values from such ores.

BACKGROUND OF THE DISCLOSURE

Although it was discovered in 1879, for much of its history, scandium was a commercially insignificant metal with few practical uses. More recently, however, scandia-stabilized zirconia has gained importance as a high efficiency electrolyte in solid oxide fuel cells, while scandium oxide (scandia or $Sc_2O_3$) is used to make high intensity discharge lamps. Scandium alloys, and especially scandium aluminum alloys, have also attracted interest in various aerospace applications, as demonstrated by their use in the MiG-21 and MiG-29 aircraft.

Scandium alloys offer numerous advantages over other metal alloys in various applications. For example, some scandium-reinforced alloys are much stronger than their non-scandium counterparts. Moreover, the use of scandium in some metal alloys significantly improves the grain refinement of the alloys, and eliminates hot cracking and improves strength in welds. Scandium alloys also exhibit good resistance to corrosion.

Scandium-aluminum alloys are of particular commercial interest, since these alloys exhibit a lower specific gravity compared to the more widely used titanium aluminum alloys. Thus, for example, Sc—Al has a specific gravity of 2.8 compared to 4.5 for $Ti_6Al_4V$. In a commercial airline fleet, this difference in specific gravity translates into substantial fuel savings on an annual basis.

Despite the many advantages offered by scandium and its alloys, the widespread use of scandium has been hampered by the low availability (and consequently high cost) of the metal. Although scandium is not a particularly rare metal in terms of its abundance in the Earth's crust, there are currently no known, easily extractable deposits of minerals which contain high concentrations of the metal. Consequently, most scandium today is obtained as a byproduct of other metal recovery processes, typically from the treatment of tailings or metal sludges obtained from the refining of other metals. For example, scandium is frequently recovered as a byproduct of the treatment of tungsten and uranium tailings, or from waste streams resulting from the processing of titanium-containing ores and concentrates into titanium dioxide pigments. Scandium can also be obtained from the treatment of red mud, a waste product of the Bayer process used to refine bauxite into alumina.

SUMMARY OF THE DISCLOSURE

In one aspect, a method is provided for extracting scandium values from a scandium bearing laterite ore. The method comprises (a) providing a portion of a scandium bearing laterite ore having an average particle size of no more than 200 mesh; (b) leaching the ore, thereby producing a leachate; and (c) recovering scandium values from the leachate.

In another aspect, a method is provided for extracting scandium values from a scandium bearing laterite ore. The method comprises (a) providing a portion of ore from the limonite fraction of a scandium-bearing laterite ore deposit having an average particle size of no more than 200 mesh; (b) subjecting the ore to high pressure acid leaching, thus yielding an acidic leachate; (c) extracting scandium values from the leachate, thereby obtaining a scandium bearing solution and an acidic raffinate; and (d) extracting scandium values from the scandium bearing solution.

In a further aspect, a method is provided for extracting scandium values from a scandium bearing laterite ore. The method comprises (a) providing a scandium-bearing laterite ore having an average particle size of no more than 200 mesh; (b) forming a slurry out of the ore; (c) leaching scandium from the ore; (d) recovering scandium values from the scandium bearing leachate, thereby producing a scandium bearing leachate and an acidic raffinate; and (e) using the acidic raffinate from a first iteration of steps (b)-(c) to form the slurry out of the ground ore in a second iteration of steps (b)-(c).

In still another aspect, a method is provided for extracting scandium values from a scandium bearing laterite ore. The method comprises repeating at least n times the steps of (a) forming a slurry out of a scandium bearing laterite ore, (b) leaching scandium from the ore, thereby producing a scandium bearing leachate, and (c) extracting scandium values from the scandium bearing leachate, thereby yielding a scandium bearing solution and a raffinate; wherein, in any $i^{th}$ iteration of steps (a)-(c) for $2 \leq i \leq n+1$, the raffinate obtained in the previous iteration of steps (a)-(c) is used in the step of forming the slurry in the subsequent iteration of steps (a)-(c).

In yet another aspect, a method is provided for extracting scandium values from a scandium bearing laterite ore. The method comprises repeating at least n times, where $n \geq 1$, the steps of (a) forming a slurry out of a scandium bearing laterite ore having an average particle size of no more than 200 mesh, and (b) leaching scandium from the ore, thereby producing a scandium bearing leachate; and extracting scandium values from the scandium bearing leachate obtained in the $(n+1)^{th}$ iteration of steps (a)-(b); wherein, in any $i^{th}$ iteration of steps (a) and (b) for $2 \leq i \leq n+1$, the scandium bearing leachate obtained in the previous iteration of steps (a)-(b) is used in the step of forming the slurry in the subsequent iteration of steps (a)-(b).

In another aspect, a method is provided for extracting scandium values from a scandium bearing laterite ore. The method comprises (a) producing sulfuric acid by processing elemental sulfur in a first autoclave; (b) using the produced sulfuric acid to leach a scandium bearing laterite ore in a high pressure acid leaching process, thus yielding a scandium bearing leachate; and (c) extracting scandium values from the scandium bearing leachate.

In still another aspect, a method is provided for extracting scandium values from a scandium bearing laterite ore. The method comprises (a) leaching scandium from a scandium bearing laterite ore having an average particle size of no more than 200 mesh to produce a scandium bearing leachate; and (b) recovering scandium values from the scandium bearing leachate by precipitating a scandium compound from the scandium bearing leachate. The scandium compound is preferably selected from the group consisting of scandium phosphates, scandium fluorides, scandium arsenates and scandium hydroxides.

In another aspect, a method is provided for extracting scandium values from a scandium bearing laterite ore. The method comprises (a) forming a slurry out of a scandium bearing laterite ore having an average particle size of no more than 200 mesh; (b) leaching scandium from the ore in a high pressure acid leaching (HPAL) process, thereby producing a scandium bearing leachate; and (c) filtering the scandium bearing leachate in a counter current filtration system.

DETAILED DESCRIPTION

Figure 1:
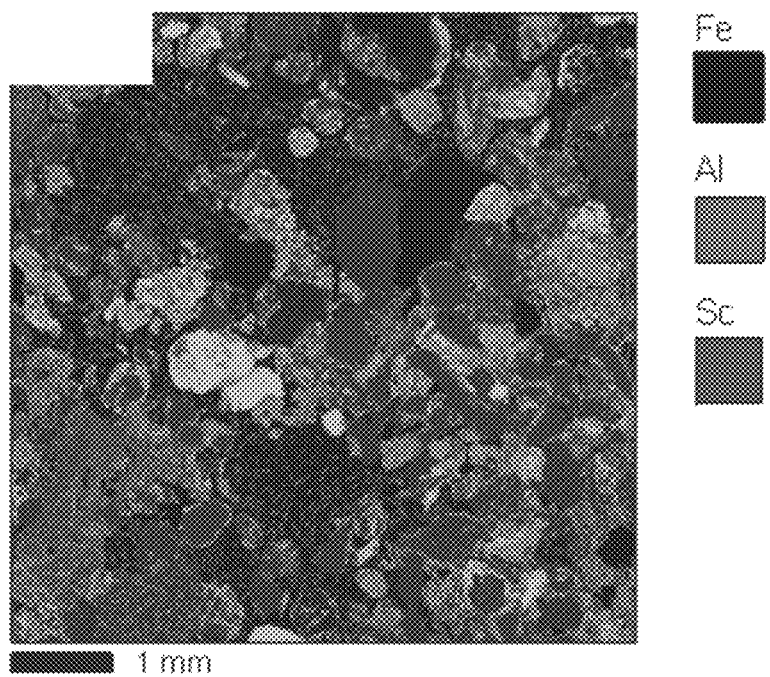
FIG. 1 is a back scattered electron picture depicting a composite three element map overlaying data for Fe, Al and Sc.

To date, the extraction of scandium from scandium bearing laterite ores has frequently been approached by analogizing the issue to the extraction of metal values from nickel laterites. However, despite some similarities between nickel and scandium laterites, and despite some similarities between the processes which may be utilized for the extraction of metal values from these ores, a number of significant differences exist as well. These differences frequently cause extraction techniques which work well with nickel laterites to fail, or to be economically unfeasible, when extended to the extraction of scandium from scandium laterites. On the other hand, techniques which are technically or economically unfeasible when applied to the extraction of metal values from nickel laterites may become feasible when applied to the extraction of scandium from scandium laterites.

By way of example, scandium is a significantly more valuable metal than nickel. Thus, at current prices, the value of nickel laterite is about $140 per ton, while the value of scandium laterite (assuming scandium levels of about 400 ppm) is approximately $1200. However, the capital cost (per unit of annual production) of obtaining the two ores is about the same. Moreover, the throughput required of a typical nickel laterite plant is about 10,000 tons per day, while that of a typical scandium laterite plant is about 200 tons per day. These differences have a significant impact on the economics of various potential processes, and may cause processes which are unfeasible when applied to the extraction of nickel from nickel laterites to become feasible when applied to the extraction of scandium from scandium laterites.

The systems and methodologies disclosed herein leverage some of the foregoing differences to provide scandium. These systems and methodologies are described in greater detail below.

A. Size Reduction

Nickel laterites are Ni—Co deposits which are formed by prolonged, intense weathering of peridotites in warm, humid climates. The weathering process removes the principal components of the peridotite (MgO and $SiO_2$) and leaves behind a 5 to 7% residue of the original rock enriched in the other major components (such as Fe, Al, and Cr) and minor constituents (such as Ni, Mn, Cu, and Co). Generally, deposits developed in situ over the host ultramafic rocks are comprised of a more or less complete weathering profile, which may be complicated by the presence of a local cover or the absence of some weathering zones in the profile because of mechanical erosion. A complete profile (from the bottom up) comprises: (a) ultramafic bedrock; (b) a lower zone of saprolitized peridotite, with or without partially weathered core stones; (c) a transition zone, which may be dominated by quartz or smectite clays; (d) a ferruginous saprolitic limonite zone; (e) a somewhat recrystallized, and locally transported, limonite zone; (f) a goethite-hematite duricrust; and often a layer of overburden material. A scandium laterite consists of an Alaskan-type ultramafic complex made up of a range of rock types, including hornblende, monzonite, hornblendite, pyroxenite, olivine, pyroxenite to dunite-peridotites. A complete scandium laterite profile has similar components.

While the overall geochemistry of formation of nickel laterites is similar to that of scandium laterites, there are also substantial differences between the two. For example, the bedrock of nickel laterites are mostly composed of serpentinized harzburgite. Harzburgite, an ultramafic rock and belonging to the peridotite group, is an igneous plutonic rock and is composed of orthopyroxene $((Mg,Fe)_2Si_2O_6)$ and olivine $((Mg,Fe)_2SiO_4)$. Orthopyroxenes consist mainly of MgO and $SiO_2$, with lesser amounts of FeO and minor amounts of $Al_2O_3$.

The bedrock of scandium laterites mainly consists of peridotite or dunite (a magnesium ferrous iron silicate) and hornblende, the latter of which has the chemical formula $(Ca,Na)_{2-3}(Mg,Fe,Al)_5(Si,Al)_8O_{22}(OH,F)_2$. The presence of significant amounts of aluminum in scandium laterite bedrock is notable. This aluminum results in the formation of a hydrated aluminum silicate phase (kaolinite, $Al_2Si_2O_5(OH)_4$), which makes up a major constituent of the limonite zone. In the case of nickel laterites, the minor quantity of aluminum results in the formation of boehmite, a hydrated aluminum oxide, AlO(OH) and secondary kaolinite which form minor constituents of the limonite zone of nickel laterite ore. Consequently, a nickel limonite phase typically comprises around 5% $Al_2O_3$, whereas a scandium limonite phase has amounts of $Al_2O_3$ as high as 20%.

The ferrous iron in both bedrocks is oxidized as weathering progresses and ultimately forms goethite, a hydrated iron oxide having the chemical formula FeO(OH). In nickel laterite formation, it is well established that nickel is taken up inside the crystal structure of the goethite by partial replacement of $Fe^{2+}$ for $Ni^{2+}$. In fact, it is typically the case that all of the goethite in nickel laterites will be nickeliferous. While it has been assumed that scandium behaves similarly during scandium laterite formation, mineralogical studies have indicated that only some goethite is scandiferous, and the rest is completely barren of scandium.

Detailed mineralogical studies show that the goethite occurrences, including compact particles, have somewhat elevated levels of aluminum, and suggest a possible relationship between aluminum and scandium content. In particular, in goethite occurrences with over 1% aluminum, scandium concentrations tend to increase. There also appears to be a correlation between scandium and phosphorus such that, in general, an increase in phosphorus content is accompanied by an increase in scandium content.

The foregoing relationships are of considerable interest, due to the well-known affinity between scandium, phosphorus and aluminum. These affinities lead to formation of independent minerals such as kolbeckite, and isomorphous substitutions in aluminum phosphates such as variscite. It is conceivable that the scandium, aluminum, and phosphorus associations in the goethite might actually occur as submicroscopically dispersed specific scandium compounds. In addition to these elements, the goethite particles also show elevated silica levels.

It has now been found that the scandium content within the goethite is present not in the goethite crystal structure, but in discrete, sub-micron separate minerals mainly as a phosphate, such kolbeckite ($ScPO_4.2*H_2O$), pretulite ($ScPO_4$), or variscite ($(Al,Sc)PO_4.2*H_2O$). This arrangement may be appreciated from the Back Scattered Electron picture of FIG. 1, which shows a composite, three element map overlaying the data for Fe, Al and Sc. In this type of map, the association between Fe and Sc is evident as a merging of grains that are high in Fe (blue) and high in scandium (red). Consequently, grains that contain Fe and high levels of Sc are a pink/mauve in color.

The foregoing suggests the need for a somewhat different approach in recovering scandium values from laterite ores than the approach used to recover nickel values. In particular, since nickel is taken up inside the crystal structure of the goethite by partial replacement of $Fe^{2+}$ for $Ni^{2+}$, total chemical dissolution of the goethite phase is required in order to access the nickel in the goethite mineral. By contrast, since the scandium content within goethite is not incorporated into the goethite crystal structure, in order to dissolve the scandium from the scandiferous goethite, fine grinding of the ore should improve the leaching kinetics as well as the total extraction of scandium when leached in an HPAL circuit.

This is further confirmed by the above BSE picture in FIG. 1, which shows quite large scandium containing particles. Thus, while nickel laterites do not benefit from a size reduction step, the scandium limonite processing flowsheet should possibly include a grinding step. Preferably, the aforementioned grinding step reduces the scandium laterite ore to an average particle size of no more than 800 mesh (296 microns), preferably no more than 500 mesh (185 microns), more preferably no more than 300 mesh (111 microns), and most preferably no more than 200 mesh (74 micron).

For the sake of completeness, it is to be noted that conventional nickel laterite deposits generally contain greater than 1.0% Ni and less than 70 ppm Sc. These are distinguishable from the preferred scandium laterites in that the latter are very low grade nickel ore bodies which contain less than 0.2% Ni, but which are high grade scandium ore bodies (that is, they contain greater than 100 ppm Sc).

B. Recycle of Raffinate

Figure 7:
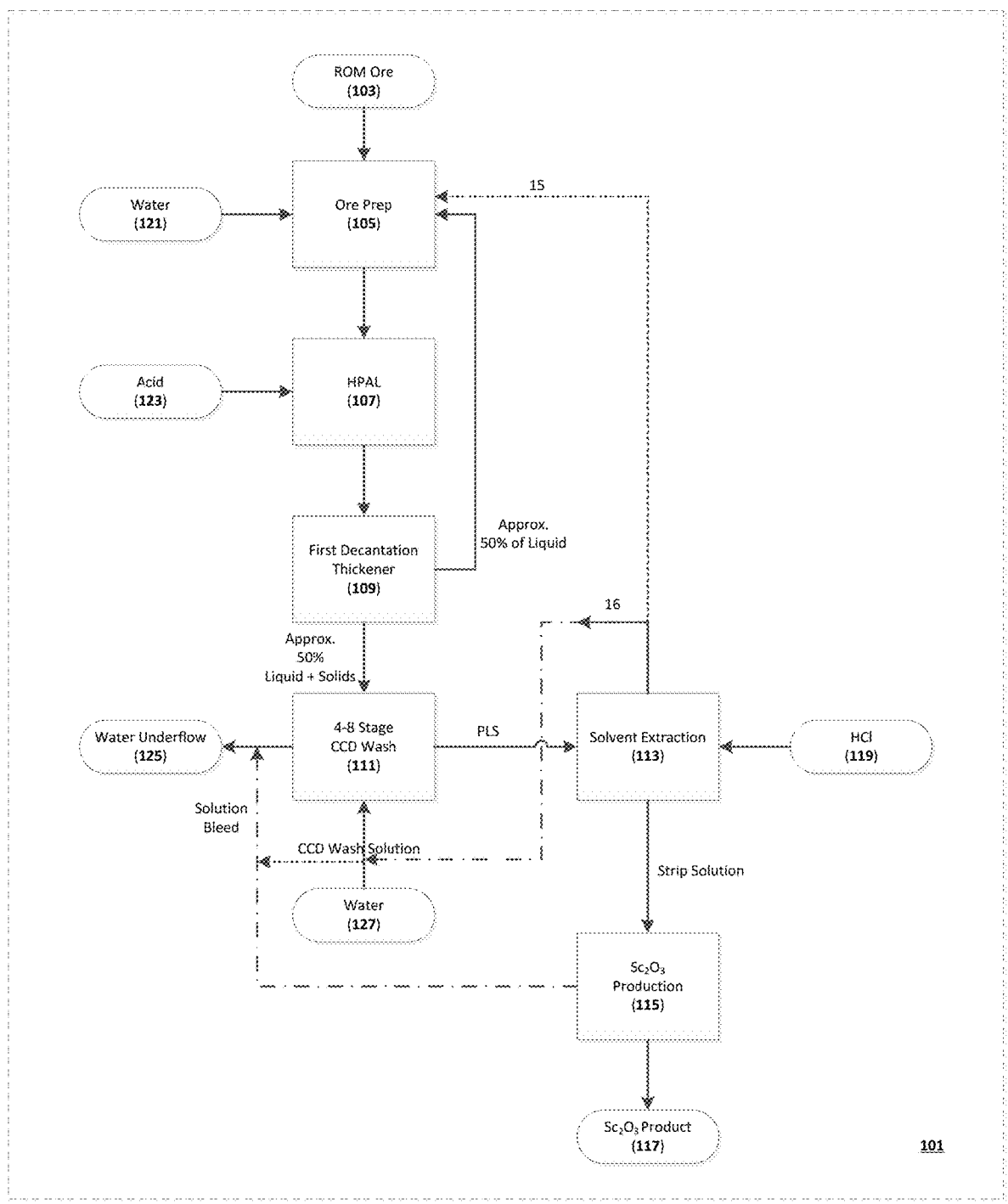
FIG. 7 is a flowchart of a particular, non-limiting embodiment of a process for obtaining scandium from an ore feedstock in accordance with the teachings herein.

FIG. 7 depicts a particular, non-limiting embodiment of a solvent extraction process in accordance with the teachings herein. The process 101 depicted therein commences with a suitable ore feedstock 103 such as, for example, a scandium laterite ore mined from an ore deposit. The ore is suitably prepared 105 for leaching as, for example, by creating a slurry through the addition of water 121. The ore is then subjected to high pressure acid leaching (HPAL) 107, which typically involves the addition of acid 123 to the ore. A first decantation thickener step 109 follows, in which approximately 50% of the liquid from the HPAL 107 is decanted and recycled to the ore preparation step 105.

The remaining (approximately 50%) liquid and solids are routed to a 4-8 stage Counter Current Decantation (CCD) wash circuit 111. The CCD wash circuit 111 typically requires a source of additional water 127 as an input. The CCD wash circuit 111 produces a pregnant leach solution (PLS) as the primary output, and generates water underflow 125 as a byproduct.

The PLS is passed to a solvent extraction circuit 113, which utilizes HCl 119 as an input. A preferred embodiment of the solvent extraction circuit 113 is described in commonly assigned U.S. Ser. No. 14/976,421 (Duyvesteyn), filed on Dec. 21, 2015 and entitled "Solvent Extraction of Scandium From Leach Solutions", now issued as U.S. Pat. No. 9,982,326, which is incorporated herein by reference in its entirety. The strip solution is then passed to an $SC_2O_3$ production circuit 115, which generates the final $SC_2O_3$ product 117. The raffinate generated from the solvent extraction circuit 113 may be recycled to the ore preparation step 105 and/or the CCD wash solution used in the CCD wash step 111, as described in further detail below.

As noted above, the preferred method herein for extracting scandium values from ores involves high pressure acid leaching (HPAL) 107 of scandium laterite ore. One objective of the HPAL process 107 is to produce a slurry of the ore that can be processed through an autoclave. The autoclave preferably runs at a temperature within the range of about 225° C. to about 300° C., and more preferably within the range of about 255° C. to about 270° C., and at a pressure within the range of about 300 psia to about 1000 psia, and more preferably within the range of about 450 psia to about 850 psia. The ore is repulped with water to produce a slurry density which is preferably between 10% and 50% solids, more preferably between 15% and 45% solids, and most preferably between 25% and 35% solids.

As seen in FIG. 7, the leachate from the HPAL process 107 is preferably passed through a solvent extraction (SX) circuit 111, thus producing a scandium bearing solvent and a raffinate. The raffinate contains a significant amount of low grade sulfuric acid due to the carry-over of acid through the SX circuit 111. The SX circuit 111 feed is derived from the HPAL 107 discharge, where acid levels of as much as 50 gpl can be experienced. Since a higher acidity is beneficial for scandium extraction by solvent extraction from a leach solution (see U.S. Ser. No. 14/976,421 (Duyvesteyn), referenced above), a higher acidity would incur a higher cost if the acid cannot be recycled. This acid in this type of process is normally neutralized with lime, a process which entails a double cost in terms of wasted acid and the lime consumed in neutralizing it.

It has now been found that an improvement can be made to the scandium flowsheet by using the waste aqueous stream (raffinate) of the solvent extraction circuit to repulp the ore (see circuit 15 in FIG. 7) instead using of water for that purpose. Since acid costs can amount to as much as 50% of the operating cost, the recycle of some of the acid in this manner is very cost effective.

The presence of acid in the solvent extraction (SX) 113 feed arises from the use of acid (typically sulfuric acid) in the HPAL leaching 107 step, which is required for several purposes. First of all, additional acid is required to replace acid consumed by the solids as aluminum oxide in the ore in converted into alunite $(H_3O)Al_3(SO_4)_2(OH)_6$ precipitates. A small amount of basic iron sulfate ($FeOHSO_4$) is also formed, which results in an acid loss to the solid tails.

Secondly, various metals (such as, for example, magnesium and manganese) in the ore dissolve and remain in solution, thereby taking up sulfuric acid. A certain amount of acid is required to remain in solution to provide the driving force for the leach reaction to take place.

Finally, that while leaching is essentially the chemical reaction between the hydrogen ion in the aqueous phase and oxygen present in the solid phase, the amount of hydrogen that is available in HPAL leaching at the temperatures experienced inside of the autoclave is only 50% of that present in the leach solution. This is due the stability of the bisulfate ion under HPAL conditions according to the following equilibrium:

$$H_2SO_4 = H^+ + HSO_4^-$$

Hence, the leach discharge when at room temperature still contains a significant amount of "free" sulfuric acid (as much as 50 gpl or about one third of the acid added to the leach).

The pregnant leach solution (PLS) obtained as a result of the counter current decantation 111 of the HPAL 107 discharge is processed in a nickel flowsheet by neutralization of all the acid (requiring expensive lime) prior to either solvent extraction, ion exchange or hydroxide precipitation. In the case of a scandium flowsheet, there is no requirement to neutralize any excess acid. To the contrary, the extraction efficiencies of many solvents used in scandium extraction are found to actually improve as the pH of the scandium PLS is reduced, thus making the addition of acid beneficial (see, e.g., commonly assigned U.S. 62/096,538, entitled "Solvent Extraction of Scandium from Leach Solutions", which is incorporated herein by reference). Consequently, the waste solution, depleted of scandium, contains significant acid values that can be re-utilized to repulp the ore during ore preparation.

Various modifications may be made to the foregoing process. For example, in some embodiments, the solution from the $Sc_2O_3$ production step 111, which may be scandium barren or may simply contain a much lower level of scandium than the strip solution, may be recycled to the ore preparation step 105, alone or in combination with the raffinate. Similarly, any waste solution containing scandium, either generated during processing of scandium ore or purchased from third parties, may be combined with the raffinate stream to the ore preparation step 105.

As noted in FIG. 7, a preferred embodiment of the scandium recovery process disclosed herein utilizes a first decantation thickener option 109. It is to be noted that such an option is typically not employed in HPAL processing of conventional nickel laterite ores. This conventional route essentially uses 4-8 washing thickeners in a counter current mode.

There are some significant process benefits to be gained if the PLS scandium concentration is enriched beyond the current levels of about 150 ppm. This may be achieved by a one stage settling step in the first decantation thickener 109 step and by directing the overflow (laden with scandium) back to the ore preparation step 105 (as, for example, by mixing it with the raffinate and recycling the mixture back to the ore preparation step 105). This overflow may contain as much as 50% of the liquid (and hence of the scandium) present in the HPAL leach discharge. In some embodiments, this process step may more than double the scandium content of the PLS.

C. Recycle of PLS

Generically speaking, both solvent extraction and ion exchange processes operate with an organic component that can hold a few grams of metal per liter of organic. If a PLS contains metals in the range of grams per liter, the required Organic-to-Aqueous ratio (O/A) to extract the metals is typically in the range of about 1:1 or 1. If the PLS contains only 0.1 gpl metal, an O/A of about 1:30 is required. This implies that SX equipment with a large capacity (volume) is required. The current scandium process flowsheet produces a scandium concentration in the PLS of about 0.1 gpl Sc.

If scandium PLS containing 0.1 gpl Sc is recycled back to ore preparation displacing the water needed to repulp the ore for processing in HPAL, the scandium content of the resulting PLS will increase to approximately 0.2 gpl. A further recycle of this PLS will approximately double the Sc content again to 0.4 gpl. Processing this 0.4 gpl Sc solution through SX can now be done with an O/A ratio of about 7, thereby decreasing the size of the SX unit operation down to about 25% of the size that was needed prior to PLS recycle.

D. High Pressure Acid Leach Using Elemental Sulfur for In Situ Acid Production

As indicated above, HPAL plants typically use concentrated sulfuric acid for the leaching. This sulfuric acid, which is injected into the autoclave at high temperatures and pressures, is typically purchased or is generated on site. Various proposals have been made employing either elemental sulfur or a sulfur containing material (such as, for example, pyrite or a sulfide concentrate) for the in situ production of sulfuric acid in HPAL. This approach, while potentially providing savings on the purchase and shipping cost of concentrated sulfuric acid, has some negative aspects as well which must be balanced against the potential reduced sulfuric acid cost. For example, this approach requires the use of tonnage oxygen, larger autoclave sizes (since the sulfur oxidation kinetics are slower than the goethite leaching kinetics) and brick lined autoclaves rather than titanium-lined autoclaves (since titanium and oxygen do not go together well at these operating conditions). This approach also requires higher impurity dissolutions, and hence, increases impurity removal load in solvent extraction, while also potentially causing co-precipitation of scandium.

It is well known that elemental sulfur in water can readily be oxidized in an autoclave to produce sulfuric acid. Unfortunately, such an autoclave process provides only low grade acid solutions (up to 50% sulfuric acid). However, it has now been found that such a low grade sulfuric acid solution may be readily used for ore preparation in the scandium laterite HPAL process described herein.

For example, a required A/O ratio of 0.4 tons of acid per ton of ore one liter of HPAL slurry contains approximately 350 grams solid per liter. This will require an acid addition of 350*0.4 or 140 gram per liter. This is equivalent to an 8% sulfuric acid solution, something a separate autoclave for elemental sulfur oxidation can more than readily produce. By replacing the water typically used in ore preparation or pulping with either PLS or raffinate, the elemental sulfur may be converted into a usable sulfuric acid stream for HPAL.

E. Counter Current Decantation (CCD)

In a typical nickel laterite HPAL process, between 5 and 8 stages of counter current washing (in thickener vessels) of the HPAL leach discharge are used. The actual number of stages may depend on a number of factors, such as the required nickel recovery, the cost of CCD circuit equipment, the wash ratio applied, the settling rate, and the settling density. The physical quality of the leached solids varies considerably, due to the different compositions of the original ore.

By contrast, scandium laterite tails solids are found to settle fast and to filter well. As a result, it has been found that a compact counter current filtration system may be employed in a scandium laterite HPAL process, rather than using thickeners which require a significant amount of surface area.

F. PLS Processing Into an Intermediate Product

The scandium pregnant leach solution (PLS) without recycle only contains 100 ppm pay metal (Sc). Normal metal solutions that undergo solvent extraction run about a few grams per liter metal. Interestingly, the value of one liter scandium PLS is currently around $0.15, whereas a copper PLS with, say, 4 gpl Cu currently has a value of only $0.03 per liter.

The conventional processing of nickel PLS has been through either solvent extraction or ion exchange, followed by nickel electrowinning. More recently, it has been found to be advantageous to separate the front end of the process (HPAL plus CCD) from the tail end (metal production) be means of a hydroxide precipitation step using MgO to produce a Mixed Hydroxide Precipitate (MHP). The mixture refers to nickel and cobalt. A typical MHP contains:

TABLE 1

Typical MHP Composition

| Element | Wt % |
|---|---|
| Ni | 40 |
| Co | 4 |
| Mg | 3 |
| Mn | 4 |
| S | 5 |
| Zn | 1 |

Figure 2:
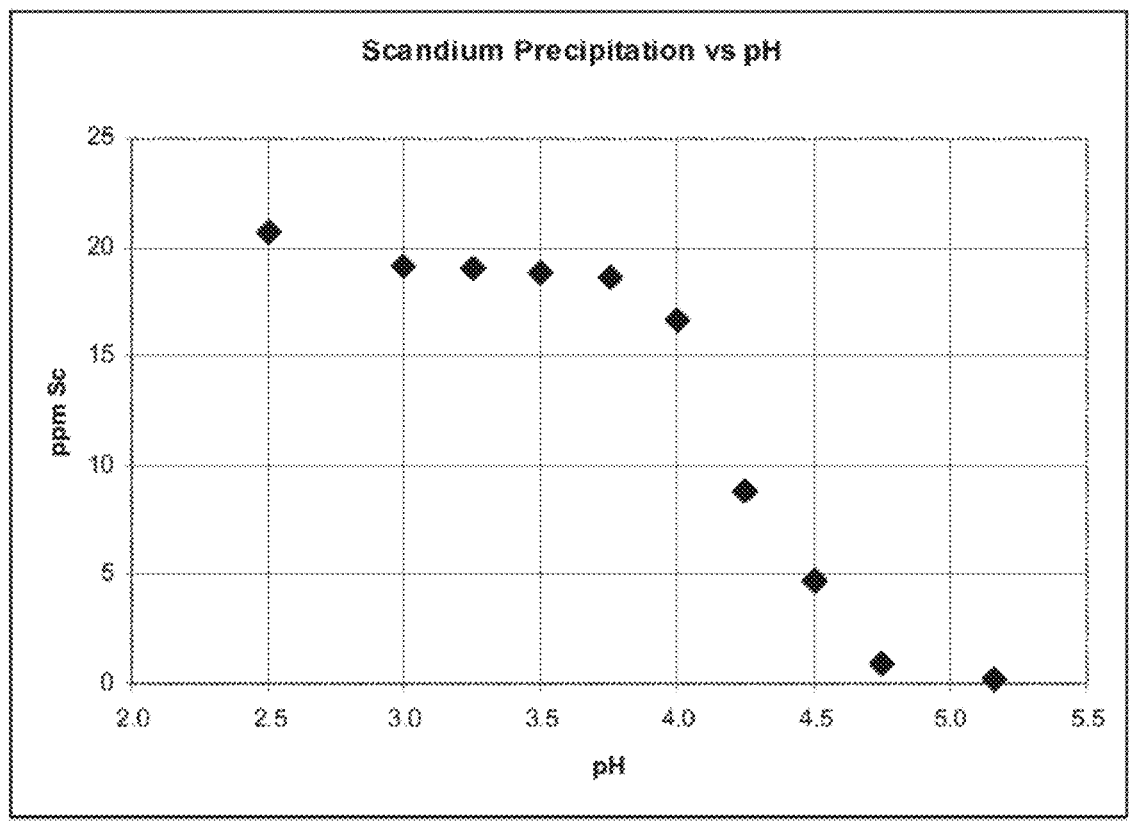
FIG. 2 is a graph of Sc precipitation as a function of pH.

EP2796574 A1 (Vale), entitled "A Method for Recovering Scandium from Intermediate Products formed in the Hydrometallurgical Processing of Laterite Ores", discloses the concept of processing an "intermediate" product from the processing of nickel laterite leach solutions. This is carried out by hydroxide precipitation, and is based on the precipitation of scandium by increasing the pH as shown in FIG. 2.

One significant problem with the approach of Vale is the co-precipitation of other metal hydroxides (mainly iron and aluminum) with scandium hydroxide. This can be understood with reference to the hydroxide solubility products for the three metals in TABLE 2 below:

TABLE 2

Phosphate and Hydroxide Solubility Products

| | Solubility Product | |
|---|---|---|
| Element | Phosphate | Hydroxide |
| Sc | $10^{-27}$ | $10^{-16}$ |
| Fe | $10^{-22}$ | $10^{-38}$ |
| Al | $10^{-18}$ | $10^{-33}$ |

As seen in TABLE 2, both aluminum and iron hydroxides are more insoluble than scandium, so the precipitation of scandium hydroxide from hydroxide solutions containing Fe and Al will be expected to precipitate these metal hydroxides as well.

It has now been found that the foregoing problem may be overcome by using a phosphate precipitation process instead of a hydroxide precipitation process. As seen in TABLE 2, if a phosphate PLS precipitation process is employed instead, both iron and aluminum are more soluble as phosphates than scandium. Hence, the precipitation of scandium phosphate from phosphate solutions containing Fe and Al will be expected to precipitate these metal phosphates as well. Indeed, it is estimated that a precipitate assaying 10% scandium or more may be obtained if this process is used. This novel, high grade scandium intermediate may now be readily upgraded to final product quality in a very small and compact processing plant.

G. Reduced Solubility of Scandium in Autoclave

The extraction of scandium after HPAL leaching has been found to vary considerably, and in some cases falls to quite low levels. This situation may be appreciated with respect to FIG. 3, which depicts the scandium extraction achieved in 21 different HPAL tests. As seen therein, in several of the tests, acceptable levels of scandium extraction were achieved. For example, TEST #8 achieved an acceptable extraction level of 87%. However, TEST #3 and TEST #11 demonstrated poor scandium extraction.

Without wishing to be bound by theory, the foregoing results are believed to be due to the reduced solubility of scandium in the HPAL autoclave as the in situ sulfuric acid concentration at the operating temperature exceeds a certain level. This is believed to be due to the formation of scandium sulfuric acid double salts $Sc_2(SO_4)_3 \cdot nH_2SO_4$ under such conditions, and the decreasing solubility of these double salts with increasing acid normalities.

Figure 3:
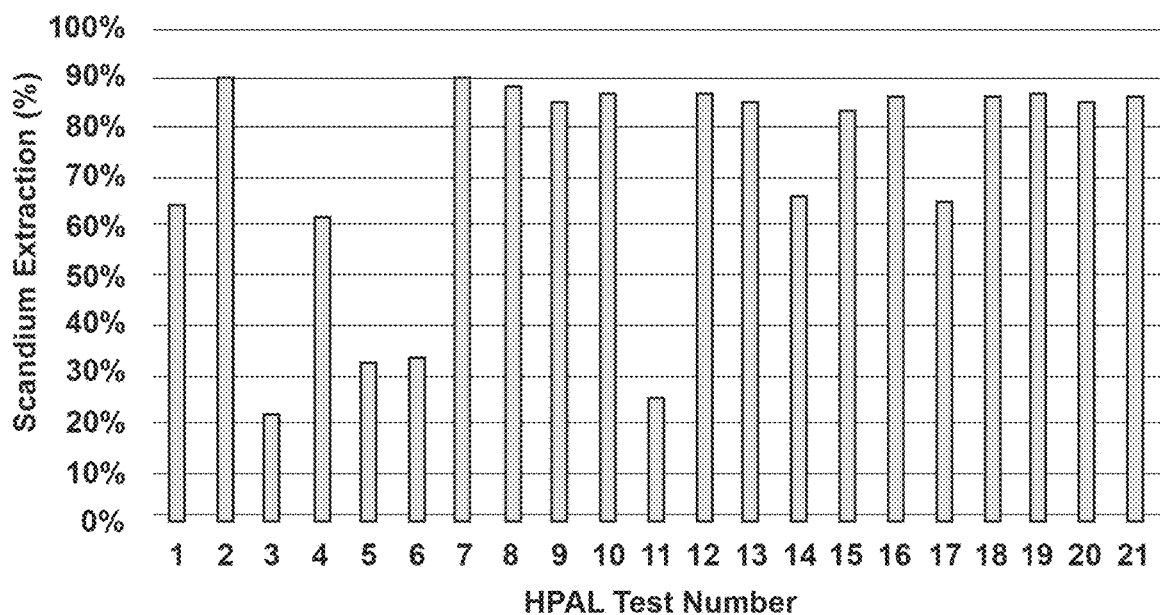
FIG. 3 is a graph of the scandium extraction % for each of several numbered HPAL test batches.
Figure 4:
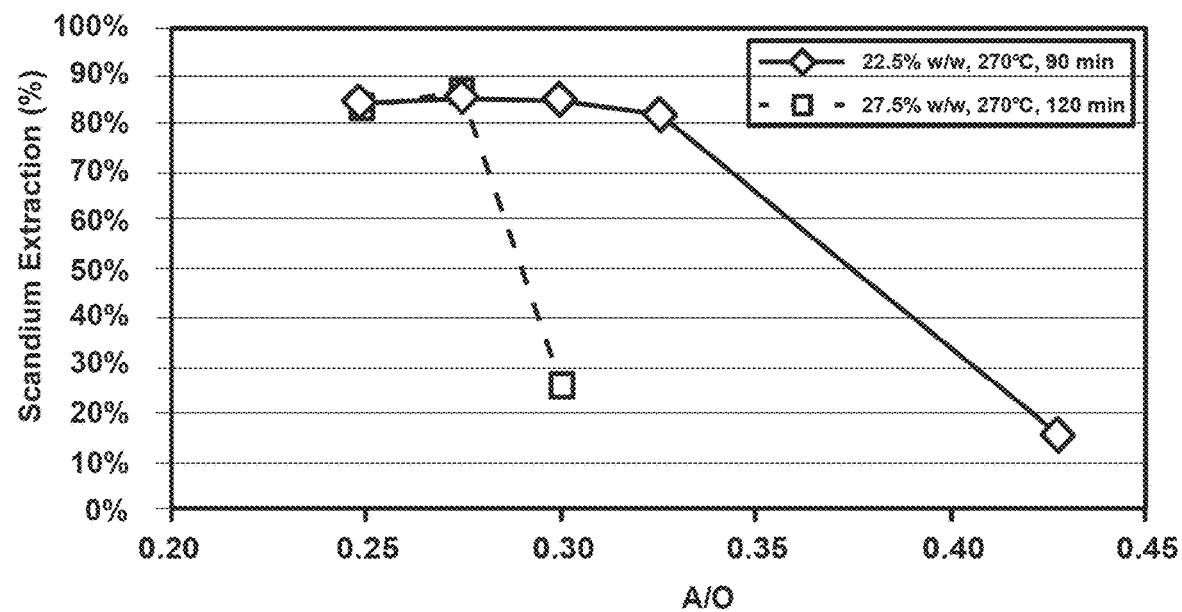
FIG. 4 is a graph of scandium extraction, as a function of the weight of acid added over the weight of dry ore introduced (A/O), at two different solids densities (w/w) and leaching durations (in min.).

The foregoing may be appreciated by examining the detailed conditions of TEST #3 and TEST #8 of FIG. 3, which are depicted in FIG. 4. As seen therein, scandium extraction decreases as the amount of acid added to the autoclave (expressed as A/O, or the weight of acid added divided by the weight of dry ore introduced) increases. This is consistent with the decreasing solubilities of scandium sulfuric acid double salts $Sc_2(SO_4)_3 \cdot nH_2SO_4$ with increasing acid normalities, as may be appreciated from the data in TABLE 3.

TABLE 3

Solubility of Scandium Sulfate in Water and in Aqueous Sulfuric Acid at 25° C.

| Solvent | g $Sc_2(SO_4)_2$/100 g Saturated Solution | Solid Phase |
|---|---|---|
| Water | 28.52 | $Sc_2(SO_4)_2 \cdot 5H_2O$ |
| 0.5 n $H_2SO_4$ | 29.29 | $Sc_2(SO_4)_2 \cdot 5H_2O$ |
| 1.0 n $H_2SO_4$ | 19.87 | $Sc_2(SO_4)_2 \cdot 5H_2O$ |
| 4.86 n $H_2SO_4$ | 8.363 | $Sc_2(SO_4)_2 \cdot 5H_2O$ |
| 9.73 n $H_2SO_4$ | 1.315 | $Sc_2(SO_4)_2 \cdot 5H_2O$ |
| 22.35 n $H_2SO_4$ | 0.484 | $Sc_2(SO_4)_2 \cdot 3H_2O$ |

Reproduced from Atherton Seidell, "Solubilities of Inorganic and Organic Compounds: A Compilation of Quantitative Solubility Data from the Periodical Literature", Vol. 1, p. 595 (Jan. 1, 1919).

This data agrees with the data in TABLE 4, which also shows a decrease in solubility of the scandium sulfuric acid double salts $Sc_2(SO_4)_3 \cdot nH_2SO_4$ with increasing acid normalities.

TABLE 4

Scandium Solubility in Sulfuric Acid Solutions

| g $H_2SO_4$/L | 0.0 | 24.5 | 49.0 | 121.5 | 243.3 |
|---|---|---|---|---|---|
| Normality of $H_2SO_4$ | 0.0 | 0.5 | 1.0 | 4.86 | 9.73 |
| g $Sc_2(SO_4)_2$/ 100 g solution | 28.52 | 29.29 | 19.87 | 8.36 | 1.32 |

Reproduced from John Newton Friend, "A Text-book of Inorganic Chemistry", Vol. 4, p. 211 (1917).

Figure 5:
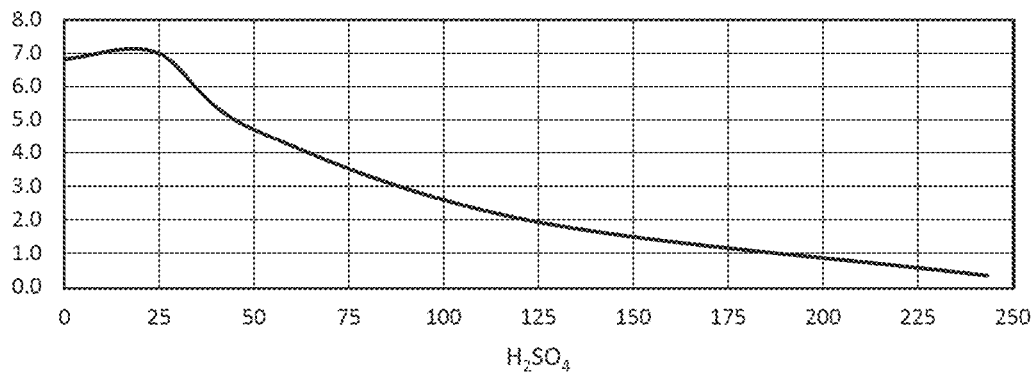
FIG. 5 is a graph of the room temperature solubility of scandium in sulfuric acid solution in g/L.
Figure 6:
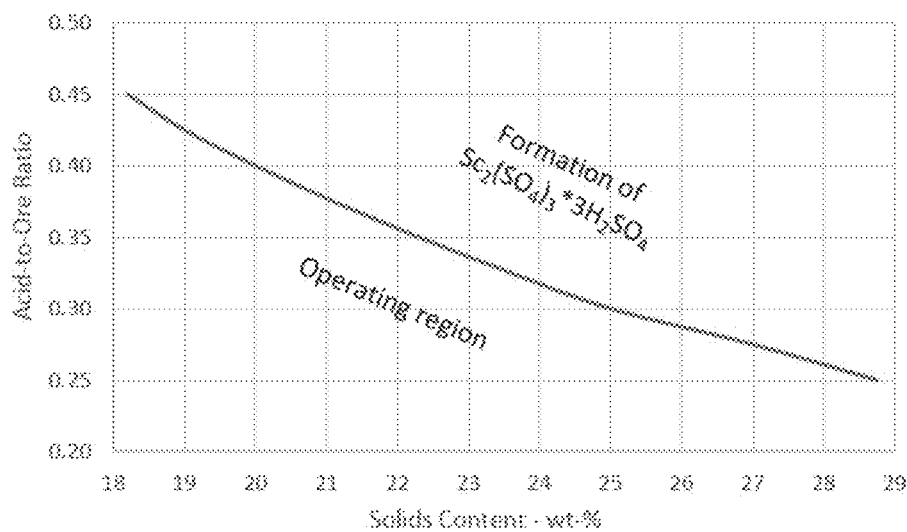
FIG. 6 is a graph of A/O as a function of solids content.

The foregoing data is plotted in FIG. 5, from which the decreasing solubility of scandium in room temperature sulfuric acid solutions with increasing acid concentration may be readily appreciated. A similar graph is shown in FIG. 6, which is based on the assumption of not exceeding a maximum sulfuric acid content (before any consumption by the ore) in the autoclave of 100 g/L acid being the limit for the formation of double salt.

The in situ sulfuric acid concentration in the liquid phase inside of the autoclave may be calculated on the basis of the amount of acid added to the autoclave (which may be expressed as A/O, as explained above) and the density of the autoclave feed (that is, the weight % solids of the slurry introduced). This relationship may be appreciated with respect to TABLE 5, in which the theoretical in situ acid concentration is calculated for varying A/O ratios and changing solid densities.

TABLE 5

A/O vs. GPL Acid

| | AO | | | | | | | | |
|---|---|---|---|---|---|---|---|---|---|
| % | 0.25 | 0.275 | 0.3 | 0.325 | 0.35 | 0.375 | 0.4 | 0.425 | 0.45 |
| 15.0 | 44.1 | 48.5 | 52.9 | 57.3 | 61.7 | 66.1 | 70.5 | 74.9 | 79.3 |
| 17.5 | 53.0 | 58.2 | 63.5 | 68.8 | 74.1 | 79.4 | 84.7 | 90.0 | 95.3 |
| 20.0 | 62.4 | 68.6 | 74.9 | 81.1 | 87.4 | 93.6 | 99.8 | 106.1 | 112.3 |
| 22.5 | 72.4 | 79.7 | 86.9 | 94.2 | 101.4 | 108.7 | 115.9 | 123.1 | 130.4 |
| 25.0 | 83.1 | 91.5 | 99.8 | 108.1 | 116.4 | 124.7 | 133.0 | 141.3 | 149.7 |
| 27.5 | 94.6 | 104.0 | 113.5 | 123.0 | 132.4 | 141.9 | 151.3 | 160.8 | 170.3 |
| 30.0 | 106.8 | 117.5 | 128.2 | 138.9 | 149.6 | 160.2 | 170.9 | 181.6 | 192.3 |
| 32.5 | 120.0 | 132.0 | 144.0 | 156.0 | 168.0 | 180.0 | 192.0 | 204.0 | 216.0 |
| 35.0 | 134.1 | 147.5 | 160.9 | 174.4 | 187.8 | 201.2 | 214.6 | 228.0 | 241.4 |

Detailed leaching data from TESTS #3 and #11 above is shown in the cells of TABLE 5. The low leaching extraction of scandium under operating conditions used for TESTS #3 and #11 may be attributed to the high in situ sulfuric acid concentrations of 123 g/L and 130 g/L of acid, respectively. By comparison, TEST #8 (the underscored cell at Row 5, Column 5 of TABLE 5) indicates a scandium extraction of about 87%. The leach operating conditions for this test were 22.5% solids density and an A/O ratio of 0.325 as shown above. The in situ acid concentration is given as 94.2 g/L $H_2SO_4$. This appears to indicate that, in order to obtain a high scandium extraction in HPAL leaching of laterite ores, the maximum calculated in situ acid concentration should not exceed approximately 100 g/L.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, absent an explicit teaching otherwise, any limitation in any dependent claim may be combined with any limitation in any other dependent claim without departing from the scope of the invention, even if such a combination is not explicitly set forth in any of the following claims.

What is claimed is:

1. A method for extracting scandium values from a scandium bearing laterite ore, comprising:
   providing a portion of a scandium bearing laterite ore having an average particle size of no more than 200 mesh;
   leaching the ore, thereby producing a leachate, wherein leaching the ore involves subjecting the ore to high pressure acid leaching (HPAL) with an acid, and further comprising forming a slurry out of the ore prior to leaching the ore; and
   recovering scandium values from the leachate;
   wherein the method further comprises performing, during the HPAL process, the steps of
   (a) periodically determining an in situ concentration of the acid during the HPAL process, and
   (b) reducing the in situ concentration of the acid when the determined concentration exceeds 100 g/L.

2. The method of claim 1, wherein the leachate is an acidic leachate, and further comprising:
   extracting scandium values from the leachate, thereby obtaining a scandium bearing solution and an acidic raffinate; and
   extracting scandium values from the scandium bearing solution.

3. The method of claim 1, wherein recovering scandium values from the leachate yields an acidic raffinate, and further comprising:
   using the acidic raffinate from a first iteration of the method to form the slurry in a second iteration of the method.

4. The method of claim 1, wherein the scandium bearing laterite ore contains scandiferous goethite.

5. The method of claim 1, wherein the scandium bearing laterite ore is from the limonite fraction of a scandium-bearing laterite ore deposit.

6. The method of claim 1, wherein the scandium bearing laterite ore contains a scandium phosphate mineral.

7. The method of claim 1, wherein the scandium bearing laterite ore contains at least one mineral selected from the group consisting of kolbeckite, pretulite and variscite.

8. The method of claim 1, wherein providing a portion of a scandium bearing laterite ore having an average particle size of no more than 200 mesh includes grinding a portion of a scandium bearing laterite ore to an average particle size of no more than 200 mesh.

9. The method of claim 1, wherein the HPAL process results in an in situ acid concentration that does not exceed 100 g/L.

10. The method of claim 1, wherein the HPAL process is characterized by a ratio of the weight of the acid to the dry weight of the ore (A/O ratio), and further comprising:
    maintaining the A/O ratio at less than 0.30 during the HPAL process.

11. The method of claim 1, wherein leaching the ore involves subjecting the ore to HPAL for at least 90 min.

12. The method of claim 11, wherein leaching the ore involves subjecting the ore to HPAL for less than 120 min.

13. The method of claim 1, wherein the portion of scandium laterite ore is from the limonite fraction of a scandium-bearing laterite ore deposit and has a scandium content of greater than 100 ppm, wherein the HPAL process yields an acidic leachate, wherein recovering scandium values from the leachate includes extracting scandium values from the leachate, thereby obtaining a scandium bearing solution and an acidic raffinate, and further extracting scandium values from the scandium bearing solution.

14. The method of claim 13, wherein providing a portion of a scandium bearing laterite ore having an average particle size of no more than 200 mesh includes grinding a portion of a scandium bearing laterite ore to an average particle size of no more than 200 mesh, wherein the acidic raffinate is used in a processing step of another iteration of the method, and wherein the processing step is selected from the group consisting of grinding steps and high pressure acid leaching steps.

15. The method of claim 13, wherein extracting scandium values from the leachate includes subjecting the leachate to at least one process selected from the group consisting of solvent extraction and ion exchange.

16. The method of claim 13, wherein the portion of ore has a nickel content of less than 0.2% Ni by weight.

17. The method of claim 1, wherein the leachate is a scandium-bearing leachate, and wherein recovering scandium values from the scandium bearing leachate includes precipitating a scandium phosphate from the scandium bearing leachate.

18. The method of claim 17, wherein the scandium bearing leachate contains Sc, Fe and Al ions.

19. The method of claim 1, further comprising:
    forming a slurry out of the scandium bearing laterite ore, wherein the leachate is a scandium bearing leachate, and further comprising filtering the scandium bearing leachate in a counter current filtration system.

20. A method for extracting scandium values from a scandium bearing laterite ore, comprising:
    (a) providing a scandium-bearing laterite ore having an average particle size of no more than 200 mesh;
    (b) forming a slurry out of the ore;
    (c) leaching scandium from the ore, thereby generating a scandium bearing leachate;
    (d) recovering scandium values from the scandium bearing leachate, thereby producing a scandium bearing leachate and an acidic raffinate; and
    (e) using the acidic raffinate from a first iteration of steps (b)-(c) to form the slurry out of the ground ore in a second iteration of steps (b)-(c).

21. The method of claim 20, wherein the slurry has a slurry density within the range of 25% to 35% solids.

22. The method of claim 20, wherein leaching scandium from the ore is conducted in an autoclave at a temperature within the range of 225° C. to 300° C., and at a pressure within the range of 450 psia to 850 psia.

23. The method of claim 20, further comprising:
    mixing a solution containing a low concentration of scandium with the acidic raffinate prior to the step of using the acidic raffinate from a first iteration of steps (b)-(c) to form the slurry out of the ground ore in a second iteration of steps (b)-(c).

24. The method of claim 23, wherein the solution containing a low concentration of scandium has a non-zero concentration of scandium and is obtained as a waste solution from a separate industrial process.

25. The method of claim 24, wherein leaching scandium from the ore includes treating the ore with high pressure acid leaching (HPAL).

26. The method of claim 25 wherein, prior to recovering scandium values from the scandium bearing leachate, the scandium bearing leachate is subjected to treatment with washing thickeners in a countercurrent mode to increase the concentration of scandium in the leachate above 150 ppm.

27. The method of claim 26, wherein subjecting the scandium bearing leachate to treatment with washing thickeners in a countercurrent mode includes a settling step, wherein the settling step results in a scandium-bearing overflow, and wherein the scandium-bearing overflow is combined with the raffinate in step (e).

* * * * *